United States Patent [19]
Dupler

[11] 3,742,929
[45] July 3, 1973

[54] HOT WATER AND HOT AIR HEATING SYSTEM

[76] Inventor: Raymond R. Dupler, 744 Euclid Avenue, Toledo, Ohio 43605

[22] Filed: Nov. 26, 1971

[21] Appl. No.: 202,133

[52] U.S. Cl. ............................................. 126/133
[51] Int. Cl. ............................................. F24c 3/04
[58] Field of Search................. 126/92, 101, 131, 126/133, 132

[56] References Cited
UNITED STATES PATENTS

| | | | |
|---|---|---|---|
| 3,181,526 | 5/1965 | Ruegg | 126/133 |
| 2,573,364 | 10/1951 | Scharff | 126/101 |
| 2,969,787 | 1/1961 | Dupler | 126/92 |
| 3,277,275 | 10/1966 | Brusven | 126/101 X |
| 2,533,692 | 12/1950 | Rice | 126/101 |
| 3,567,905 | 3/1971 | Ferraro et al. | 126/101 X |

*Primary Examiner*—Meyer Perlin
*Assistant Examiner*—Ronald C. Capossela
*Attorney*—Malcolm W. Fraser

[57] ABSTRACT

A furnace for supplying hot water and/or hot air heat for room heating purposes. A sheet metal combustion chamber containing a gas fired log is viewed through a shatterable glass window, this chamber being spaced from a housing affording passages for air to be heated from the walls of the combustion chamber. These passages lead to a plenum chamber on the top portion of the furnace. Within the combustion chamber, and arranged to receive the maximum benefit of the heat from the gas log, is a hot water pipe arranged in serpentine manner. The top of the combustion chamber is closed and the products of combustion pass to the outside through pipes at opposite ends of the combustion chamber which extend through the walls of both the combustion chamber and housing. These pipes are joined outside into a common flue. The hot air passages may be closed by insulation, thereby providing a hot water heating system alone.

1 Claim, 2 Drawing Figures

INVENTOR.
RAYMOND R. DUPLER
BY Malcolm W. Fraser
ATTORNEY

3,742,929

HOT WATER AND HOT AIR HEATING SYSTEM

INCORPORATION BY REFERENCE

In this application there is incorporated by reference U.S. Pat. No. 2,969,787, dated Jan. 31, 1961, of Raymond R. Dupler, and entitled AIR-HEATER AND SAFETY FEATURE FOR SAME.

SUMMARY OF THE INVENTION

A room heater embodying a gas fired log, which can be viewed through a window, and the heat from which heats the water in a pipe which circulates within the combustion chamber. Spaced from the walls of the combustion chamber to provide air passages is a housing, so that the heat from the combustion chamber heats the air in these passages. Such air passes to a plenum chamber from which it is conducted to the areas to be heated. Similarly, the hot water pipe leads from the top of the furnace and passes to suitable radiators, and then returns to the bottom end of the furnace. The hot water pipe within the combustion chamber is of generally serpentined form, and inclines upwardly and forwardly above the gas fired log in order to obtain the maximum heat from the log. Thus, a combined hot air and hot water heating furnace is produced. However, in the event that it is desired only to have a hot water furnace, the hot air passages can be filled with thermal insulation so that only a hot water furnace is available.

DESCRIPTION OF THE PREFERRED EMBODIMENT

Figure 1:
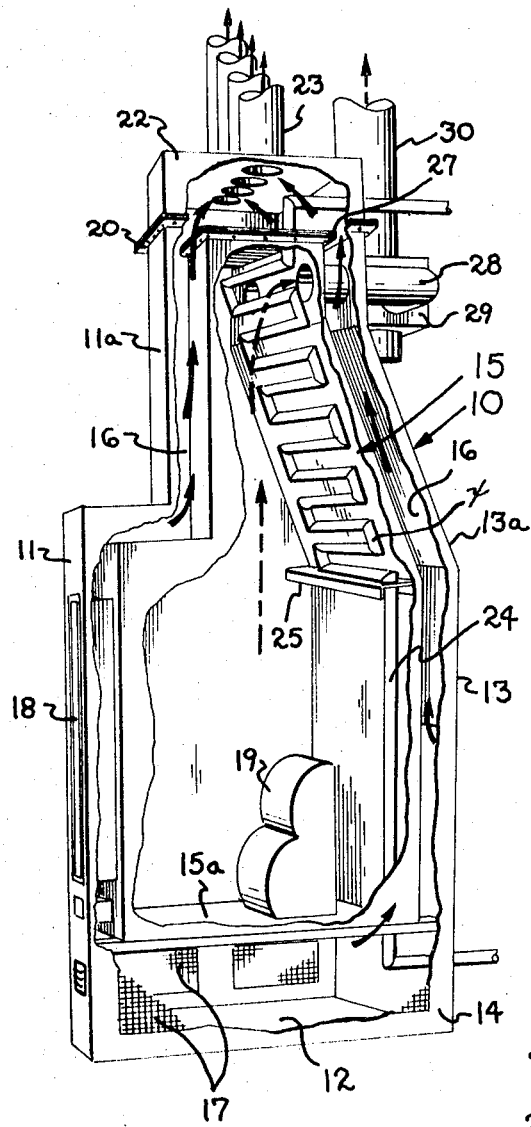
FIG. 1 is a side perspective view with portions broken away to show the interior of the furnace.

Referring to the drawings, the furnace comprises an upright sheet metal housing 10 which has a stepped front wall section 11 and 11a, a bottom wall 12, a lower rear wall section 13, which is open at its lower end, and an upper wall section 13a, which gently inclines forwardly and upwardly. The housing also has end walls 14. Within the housing 10, and in general having the same shape as that of the housing but on a smaller scale, is a sheet metal combustion chamber 15, the major portion of which is spaced from the housing. The spacing between the combustion chamber and the housing provides hot air passages 16 so that the heated walls of the combustion chamber heat the air in the passages 16. Air is admitted from the outside to the passages 16 through screened openings 17 in the lower end portions of both side walls 14, and also through the opening in the back of the housing below the wall section 13.

The front wall 11 of the housing has an opening to receive a tempered shatterable glass window 18. It will be observed that there is an opening at the front of the combustion chamber which registers with the window panel opening. Disposed within the combustion chamber and resting upon the floor 15a thereof is a gas fired log 19, the controls for which (not shown) are beneath the floor 15a. With respect to the glass window panel 18, suffice it to say that the flow of gas to the gas log 19 is instantly shut off in the event the panel is shattered, this being fully shown and described in U.S. Pat. No. 2,969,787 above referenced.

The top edges of the housing 10 are bent at right angles to provide outwardly extending flanges 20 on which rest the flanges 21 of a rectangular box 22. Suitable fasteners extend through the flanges to hold the parts together. The box 22 provides a plenum chamber to which the hot air from the passages 18 passes. In the top wall of the box 22 are a number of pipes 23 which lead to registers in the areas to be heated.

Extending from the outside to the underside of the bottom wall 15a of the combustion chamber is a hot water pipe 24 which extends upwardly along the rear wall of the combustion chamber, and thence along the upwardly and forwardly inclined section of such rear wall. The portion of the pipe in the forwardly inclined section of the wall is of serpentine form, in which the sections of the pipe are parallel to each other and spaced from each other, and the ends of these sections, as indicated at x, are mitered. In other words, the small pipe connecting the two adjacent parallel sections of the hot water pipe have mitered connections to each other. This is of importance because it imparts turbulence to the water movement and also retards the flow so as to obtain maximum benefit of the heat from the gas log 19.

The lower run of the serpentine section is supported on a ledge 25 of channel sheet metal suitably secured to the adjacent wall of the combustion chamber. It will be manifest that by inclining the serpentine form of hot water pipe in the manner shown, that the maximum benefit of the heat generated by the log 19 is obtained.

The top end of the combustion chamber in the region of the flange 20 of the housing is outwardly flanged to support an imperforate sheet metal plate 26, the edge portion of which is secured by suitable fasteners to the flanges 27. It will be observed that the upper end portion of the hot water pipe 24 extends through an opening in the closure plate 26, and then passes to suitable radiators in the rooms to be heated, from which the pipe finally returns to the furnace, as will be readily understood. A suitable seal is disposed about the opening in the plate 26 through which the pipe 24 extends to prevent any of the products of combustion from entering the plenum chamber.

Figure 2:
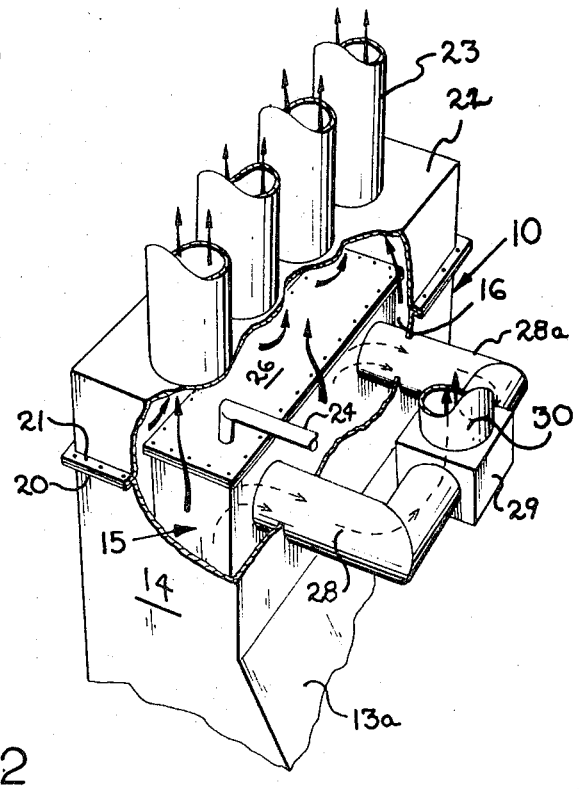
FIG. 2 is a top rear perspective of the upper portion of the furnace with parts broken away for the purpose of clarity.

The products of combustion pass from the upper end of the combustion chamber through flue pipes 28 and 28a, which are arranged at opposite ends of the combustion chamber, as shown in FIG. 2 and pass through both the walls of the combustion chamber and housing. These flue pipes are L-shaped, and join a sheet metal connecting box 29 on the outside from which extends a vertical flue 30 leading to a chimney or the like. This arrangement of the flue pipes 28 and 28a provides for the most effective distribution of the flue gases in order to capture the maximum heat generated within the combustion chamber.

Although I have shown and described the best form of my invention known to me at this time, it is to be understood that numerous changes in details of construction, arrangement, operation, and choice of materials may be effected without departing from the scope of the invention.

I claim:

1. A heater of the character described comprising a sheet metal housing having closed front and side walls, a rear wall having a forwardly and upwardly inclined upper section, top closure means for said housing in the form of a box-like member, the lower edge of which is outwardly flanged, flanges on the upper edges of said housing on which the flanges of said box-like member rest and are secured, a combustion chamber for a gas-fired log of similar shape and arranged within and spaced from the side, rear and a portion of the front wall of said housing, a common opening in the front of said housing and combustion chamber, a transparent window panel covering said common opening, a hot water pipe entering from the lower portion of said combustion chamber and arranged in a to and fro manner along the inclined upper section thereof to expose a substantial area to heat generated therein, an imperforate plate closing the upper end of said combustion chamber, the upper end of said pipe projecting through said imperforate plate, and exhaust flue means for the products of combustion from said combustion chamber extending laterally through openings in the upper end portions of said housing and combustion chamber in the region directly below said imperforate plate, said exhaust flue means comprising a pair of exhaust pipes arranged respectively adjacent opposite ends of said combustion chamber.

* * * * *